United States Patent
Bi et al.

(10) Patent No.: US 6,693,763 B2
(45) Date of Patent: Feb. 17, 2004

(54) METHOD FOR LINEARIZING MICROACTUATOR HYSTERESIS FOR A DISC DRIVE

(75) Inventors: Qiang Bi, Singapore (SG); Jimmy TzeMing Pang, Singapore (SG); Kevin Arthur Gomez, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 335 days.

(21) Appl. No.: 09/895,666

(22) Filed: Jun. 28, 2001

(65) Prior Publication Data

US 2002/0036860 A1 Mar. 28, 2002

Related U.S. Application Data (60) Provisional application No. 60/220,714, filed on Jul. 26, 2000.

(51) Int. Cl.[7] .......................... G11B 5/596; G11B 21/02
(52) U.S. Cl. .................... 360/77.05; 360/75; 360/78.09
(58) Field of Search ................................ 360/77.05, 75, 360/78.09

(56) References Cited

U.S. PATENT DOCUMENTS

| | | | |
|---|---|---|---|
| 5,452,275 A | * | 9/1995 | Ogawa .................... 369/44.11 |
| 5,521,778 A | | 5/1996 | Boutaghou et al. |
| 5,714,831 A | | 2/1998 | Walker et al. |
| 5,834,864 A | | 11/1998 | Hesterman et al. |
| 6,088,187 A | | 7/2000 | Takaishi |
| 6,101,058 A | | 8/2000 | Morris |
| 6,141,188 A | | 10/2000 | Bauck et al. |
| 6,191,518 B1 | | 2/2001 | Suzuki |
| 6,198,145 B1 | | 3/2001 | Ferrari et al. |
| 6,220,550 B1 | | 4/2001 | McKillip, Jr. |
| 2001/0001587 A1 | | 5/2001 | Lee et al. |

FOREIGN PATENT DOCUMENTS

WO     WO 99/66501     12/1999

OTHER PUBLICATIONS

U.S. patent application Ser. No. 09/219,195, Lee et al., filed Dec. 21, 1998.

* cited by examiner

*Primary Examiner*—David Hudspeth
*Assistant Examiner*—Mitchell Slavitt
(74) *Attorney, Agent, or Firm*—Fellers, Snider, et al.

(57) ABSTRACT

Linearizing hysteresis of a microactuator for a disc drive by modeling the microactuator with a first polynomial equation to provide a linear displacement response of the microactuator responding to an applied voltage, deriving a set of constants from a plurality of burst patterns for use with the first polynomial equation to provide a set of variables for use in resolving the second polynomial equation to provide a set of equations from which a set of constants can be derived for use by the second polynomial equation to provide a voltage to the microactuator to displace the microactuator by a predetermined incremental distance.

20 Claims, 8 Drawing Sheets

METHOD FOR LINEARIZING MICROACTUATOR HYSTERESIS FOR A DISC DRIVE

RELATED APPLICATIONS

This application claims priority to U.S. Provisional Application Ser. No. 60/220,714 filed Jul. 26, 2000, entitled Scheme For Calibrating Non-linearity In A Disc Drive Microactuator.

FIELD OF THE INVENTION

This invention relates generally to the field of data storage devices, and more particularly, but not by way of limitation, to incorporation of a method for linearizing the non-linear hysteresis loop of a microactuator for a disc drive.

BACKGROUND

Disc drives are used for data storage in modem electronic products ranging from digital cameras to computer systems and networks. Typically, disc drive includes a mechanical portion, or head disc assembly (HDA), and electronics in the form of a printed circuit board assembly (PCB), mounted to an outer surface of the HDA. The PCB controls HDA functions and provides an interface between the disc drive and its host.

Generally, a HDA comprises one or more magnetic discs affixed to a spindle motor assembly for rotation at a constant speed, an actuator assembly supporting an array of read/write heads that traverse generally concentric data tracks radially spaced across the disc surfaces and a voice coil motor (VCM) providing rotational motion to the actuator assembly. Modem disc drives typically utilize magneto resistive head technology that employs both an inductive element, for writing data to the data tracks and a magneto resistive element for reading data from the recording tracks.

Continued demand for disc drives with ever increasing levels of data storage capacity, faster data throughput and decreasing price per megabyte have led disc drive manufacturers to seek ways to increase the storage capacity and improve overall operating efficiencies of the disc drive. Present generation disc drives typically achieve aerial bit densities of several gigabits per square centimeter, Gbits/$cm^2$. Increasing recording densities can be achieved by increasing the number of bits stored along each track or bits per inch (BPI), generally requiring improvements in the read/write channel electronics, and/or by increasing the number of tracks per unit width or tracks per inch (TPI), generally requiring improvements in servo control systems.

One approach taken by disc drive manufacturers to improve servo control systems has been through the introduction of dual-stage actuator systems. One such system utilizes an arm mounted bipolar piezoelectric transducer (PZT) operating in parallel with the VCM and driven by a bipolar driver. To date, attempts at expanding utilization of the PZT in disc drive manufacturing processes such as measuring track spacing, or positioning a read/write head during servo track writing for improved track-to-track spacing have achieved only limited success. To effectively incorporate use of the PZT within manufacturing processes, the PZT needs to operate in an open loop mode. The presence of a characteristic non-linear hysteresis loop within the PZT has obstructed use of the PZT for positioning the read/write heads with substantially accuracy, while operating in an open loop mode. Absent feedback from a closed loop control system, positioning of read/write heads by the PZT is substantially accurate at the operating end points of the PZT. To accurately utilize the PZT between its operating end points, the non-linear hysteresis loop within the PZT needs to be overcome.

Therefore, challenges remain and a need persists for techniques of linearizing microactuator hysteresis to advance the utilization of a microactuators in an open loop mode within disc drive manufacturing processes that overcome the constraints present in disc drives with piezoelectric transducer based dual-stage actuator systems.

SUMMARY OF THE INVENTION

The present invention provides a method for linearizing microactuator hysteresis for a disc drive by selecting a polynomial equation for modeling the microactuator to provide a linear displacement response of the microactuator responding to an applied voltage, and using a first selected read/write head supported by a first actuator arm of the disc drive to servo on a set-point of a servo track of a first rotatable disc surface of the disc drive while using a second selected read/write head supported by a second actuator arm to write a burst pattern on a second rotatable disc surface of the disc drive, and sequentially servoing on each of a predetermined number of set points with the first selected read/write head while using the second selected read/write head to execute a burst scan of the burst written to the second selected rotatable disc surface for each set-point.

Additionally, the present invention provides a method for linearizing a displacement of a microactuator of a disc drive by choosing a second polynomial equation for modeling a predetermined linear displacement of the microactuator and utilizing a set of displacement variables derived from resolving the first polynomial equation based on a set of predetermined voltage values and constants derived from burst scans for resolving the second polynomial equation to provide a set of equations from which a set of constants can be derived for use by the second polynomial equation to displace the microactuator in response to a predetermined incremental increase in voltage applied to the microactuator by utilizing the set of constants and the second polynomial equation to determine a number of digital to analog conversion counts to apply to a microactuator driver driving the microactuator to attain a desired linear displacement of microactuator.

These and various other features and advantages, which characterize embodiments of the present invention, will be apparent from the reading of the following detailed description and review of the associated drawings.

DETAILED DESCRIPTION

Figure 1:
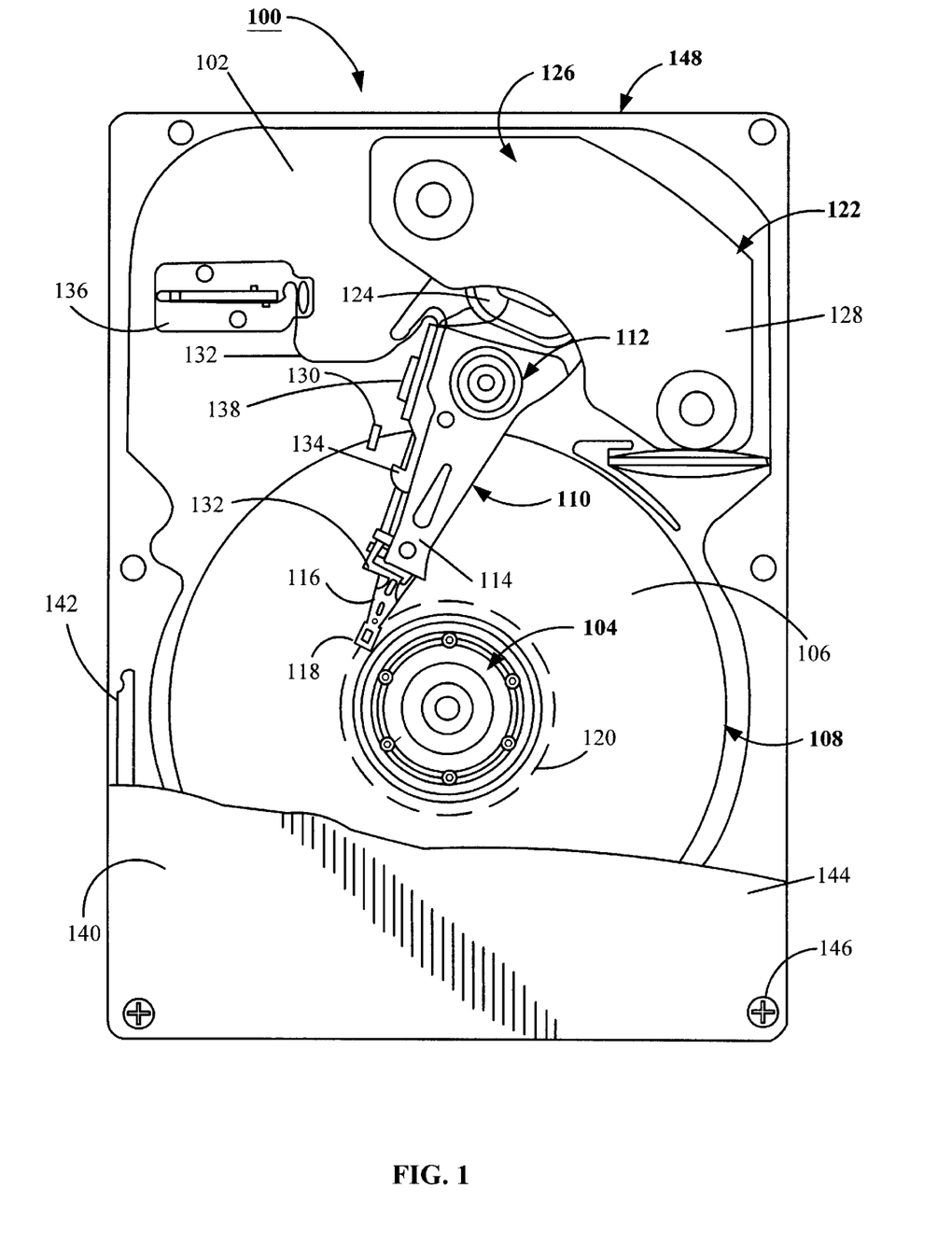
FIG. 1 is a top plan view of a disc drive incorporating a hysteresis corrected microactuator corrected by a method for linearizing microactuator hysteresis for a disc drive.

Referring to the drawings in general, and more particularly to FIG. 1, shown therein is a top view of a disc drive 100 constructed in accordance with an embodiment of the present invention. Numerous details of and variations for the construction of the disc drive 100 are not included in the following description as such are well-known to those skilled in the art and are believed to be unnecessary for the purpose of describing embodiments of the present invention.

The disc drive 100 includes a basedeck 102 supporting various disc drive components, including a spindle motor assembly 104. The spindle motor assembly 104 supports at least one axially aligned rotatable disc surface 106 forming a disc stack 108 (also referred to as a "disc pack"). Adjacent the disc stack 108 is a dual-stage actuator assembly 110 (also referred to as an "E-block" or a head stack assembly (HSA)), which pivots about a primary actuator motor support 112 (also referred to as a "bearing assembly") in a rotary fashion. The HSA 110 includes at least one actuator arm 114 that supports a load arm 116. Each load arm 116 in turn supports at least one read/write head 118 (also referred as heads 118) that correspond to each rotatable disc surface 106. Each rotatable disc surface 106 is divided into concentric data tracks 120 (only one shown) over which the read/write heads 118 are positionably located, and on which head position control information are written to embedded servo sectors (not separately shown). The embedded servo sectors separate a plurality of data sectors (not separately shown) for use by customers to store data.

The HSA 110 is controllably positioned by a primary actuator motor 122 (also referred to as a "voice coil motor assembly" (VCM)), comprising an actuator coil 124 immersed in the magnetic field generated by a magnet assembly 126. A magnetically permeable flux path provided by a steel plate 128 (also called a top pole piece) mounted above the actuator coil 124 to complete the magnetic circuit of the VCM 122. During operation of the disc drive 100, current is passed through the actuator coil 124 and an electromagnetic field is setup, which interacts with the magnetic circuit of the VCM 122 to cause the actuator coil 124 to move relative to the magnet assembly 126 in accordance with the well-known Lorentz relationship. As the actuator coil 124 moves, the HSA 110 pivots about the bearing assembly 112 (also referred to as a primary actuator motor support), causing the heads 118 to move over the surfaces of the discs 106, thereby achieving a coarse positioning of the heads 118 adjacent a selected data track 120 of the disc surfaces 106.

To attain fine position control of the heads 118 relative to the selected data track 120, the HSA 110 further includes a micro-actuator 130 (also referred to as a secondary actuator motor) supported by the load arm 116. In a preferred embodiment the micro-actuator 130 (also referred to as PZT 130) includes a bipolar piezoelectric transducer (not separately shown) that responds to positive voltage inputs by expanding in a predetermined direction, while contracting in the predetermined direction to application of a less positive voltage. As the micro-actuator 130 is affixed to the load arm 116 of the HSA 110, changes in mechanical position of the micro-actuator 130 relative to the selected data track 120 results in changes in mechanical position of the read/write head 118 relative to the selected data track 120, thereby facilitating fine position control of the read/write head 118 relative to the selected data track 120.

To provide the requisite electrical conduction paths between the read/write heads 118 and disc drive read/write circuitry (not shown), read/write head conductors (not separately shown) are affixed to a read/write flex circuit 132. The read/write flex circuit 132 is routed from the load arms 116 along the actuator arms 114 and into a flex circuit containment channel 134, then on to a flex connector body 136. The flex connector body 136 supports the flex circuit 132 during passage of the read/write flex circuit 132 through the basedeck 102 and into electrical communication a disc drive printed circuit board assembly (PCBA) (not shown) mounted to the underside of the basedeck 102. The flex circuit containment channel 134 also supports read/write signal circuitry, including a preamplifier/driver (preamp) 138 used to condition read/write signals passed between the read/write circuitry (not shown) and the read/write heads 118. The PCBA of the disc drive supports read/write circuitry, which controls the operation of the heads 118, as well as other interface and control circuitry for the disc drive 100. It will be understood; data drivers can be alternatively configured to output analog control signals to the VCM 122 and the micro-actuator 130 in response to digital input values.

The disc drive 100 has two primary assemblies, the PCBA (not shown) and a head disc assembly (HDA) 140 attached to the PCBA. Typically, included within the HDA 140 are the HSA 110, the VCM 122 and the disc pack 108.

Figure 2:
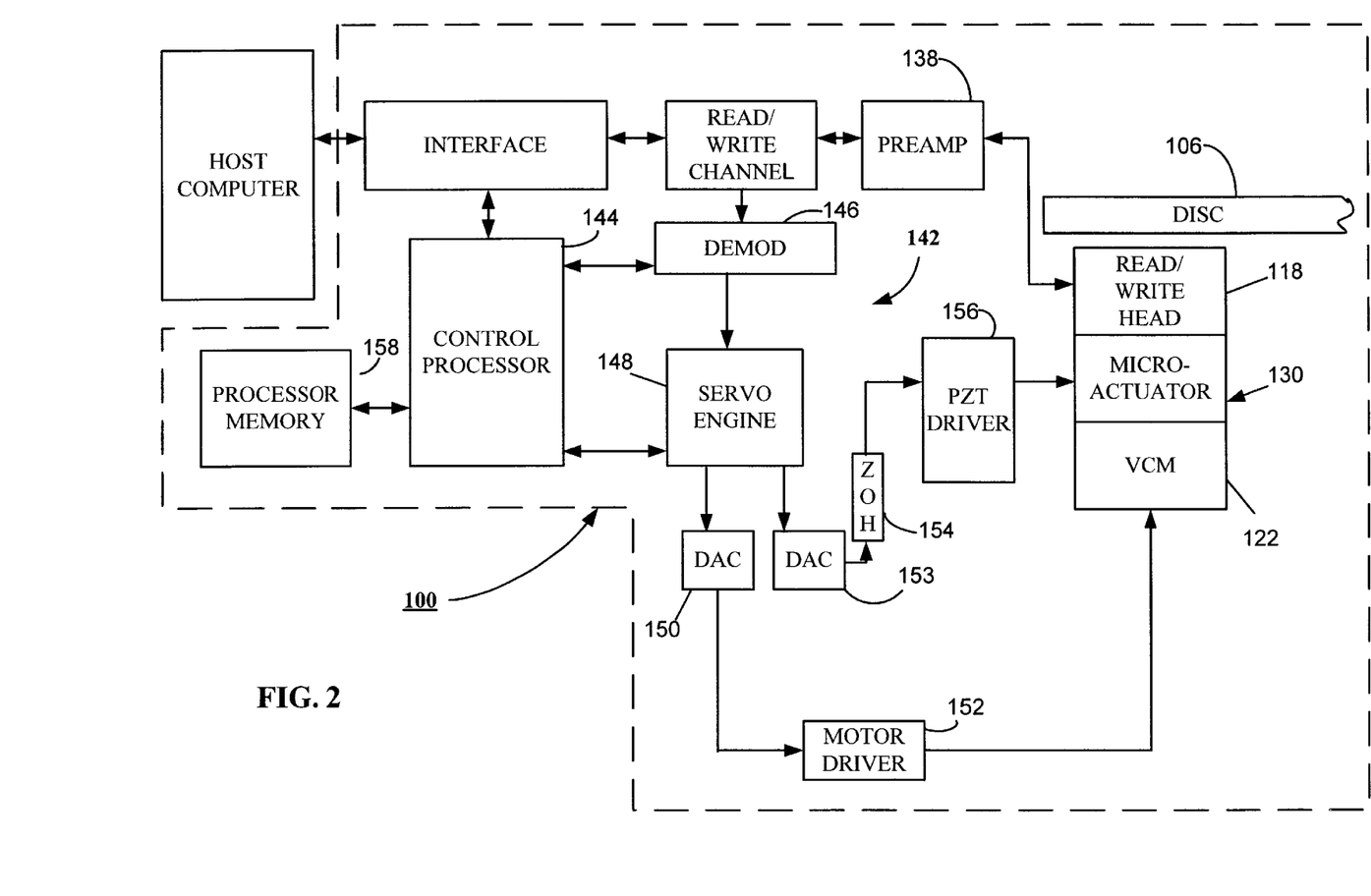
FIG. 2 is a functional block diagram of control circuitry of the disc drive of FIG. 1.

Turning to FIG. 2, position-control of the heads 118 is provided by a control circuit 142 that includes the control processor 144, a demodulator (demod) 146, an application specific integrated circuit (ASIC) hardware-based servo controller ("servo engine") 148, a digital to analog converter (DAC) 150, and a motor driver circuit 152. The components of the control circuit 142 discussed to this point are utilized to facilitate track following algorithms for the HSA 110 (not shown) and more specifically for controlling the VCM 122 in attaining a coarse positioning of the heads 118 relative to the selected data track 120 (not shown) of the rotatable disk surface 106.

The demodulator 146 conditions head position information transduced from the disc surface 106 to provide position information of the read/write head 118 relative to the data track 120. The servo engine 148 generates servo control loop values used by control processor 144 in generating command signals such as velocity-based seek signals used by VCM 122 in executing seek commands, and to maintain position of the HSA 110 during data transfer operations. The command signals are converted by the DAC 150 to analog control signals for use by the motor driver circuit 152 in directing coarse positioning of the heads 118 relative to the selected data track 120 and seek functions of the HSA 110.

In a preferred embodiment dual-stage actuator 110 has a secondary actuator in the form of the piezoelectric transducer-based micro-actuator 130 attached to the actuator arm 114 (of FIG. 1) to provide fine position control of a selected read/write head 118 relative to the corresponding selected data track 120. For the micro-actuator 130 embodiment, a DAC 153 convert and forwards positioning and correction signals received from the servo engine 148 to a zero-order hold device 154 (ZOH 154) that continually maintains the positioning signal as a voltage level until updated by a subsequent positioning signal issued by the servo engine 148. The ZOH 154 supplies a PZT driver 156, used for setting and maintaining a range of motion of the micro-actuator 130 during operation of the disc drive 100.

The term servoing (also referred to herein as position-controlling) as used herein means, maintaining control of the read/write head 118 relative to the rotating disc surface 106 of disc drive 100 (of FIG. 1) throughout all operations of disc drive 100. In other words, whether positioning the read/write head 118 relative to a selected data track 120 of the rotatable disc surface 106 during track seek operations, scanning a selected data track 120 or portion of the rotatable disc surface with the microactuator operating in open loop, or maintaining a position of the read/write head relative to a set-point (not shown) of a servo track (not shown separately) during track following operations, the position of the read/write head 118 relative to the rotatable disc surface 106 is under the control of the control circuit 142 through effecting mechanical positions of the HSA 110. Additionally, a processor memory 158 is available to the control circuit 142 during operations of the disc drive 100. A use made of the processor memory 158 is storage metrics gathered during operations of the disc drive 100.

To utilize the PZT 130 in an open loop mode, a non-linear hysteresis loop, characteristic of piezoelectric transducers, must be overcome. In a preferred embodiment, the voltage driving the PZT 130 by the PZT driver 156 is a piezo inducement signal or voltage. In response to the voltage input from the PZT driver 156, the PZT 130 either expands or contracts its physical dimension. If the PZT 130 were a device absent the effects of hysteresis, in response to a given voltage input, the PZT 130 would undergo a repeatable linear dimensional change. However, as a PZT 130 is susceptible to hysteresis and response to a given voltage input is not a linearly repeatable corresponding dimensional change in the PZT 130, corrective measures need to be made to the input voltage seen by the PZT 130 to attain a desired linear output response from the PZT 130.

Each PZT 130 has a relationship between voltage input and dimensional change that is specific to the material used and construction of the piezo plant (not shown separately). The expected piezo plant response voltage is calibrated to correlate to the desired microactuator motor dimensional change the PZT 130 undergoes in response to the applied (PZT) voltage.

Because of a nonlinear hysteresis loop of a PZT 130, the displacement of PZT 130 is not linear to the voltage applied to the PZT, absent calibration for controlled linear displacement. The error due to the non-linearity can be as large as 20% of a track pitch (not shown). In order to use PZT 130 as a linear displacement component for a use such as verifying the DC track spacing in a servo track write process, the nonlinear hysteresis loop of the PZT 130 is calibrating by measuring the nonlinear response of the PZT 130 and applying those measurements to a PZT hysteresis loop function of the PZT 130. An inverse function of the PZT hysteresis loop function can then be found, with which displacements of PZT 130 can be controlled linearly.

Figure 3:
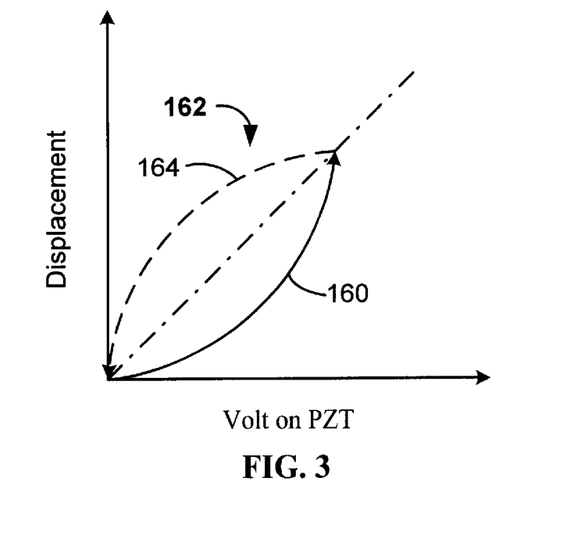
FIG. 3 provides a graphical representation of a response over one half of an operating range of a microactuator of the disc drive of FIG. 1.

FIG. 3 shows the repeatability of PZT 130 movement is very good and can be used as a fine positioner for the read-write head in an open loop sense, via a voltage applied across the PZT 130. However, because of the characteristic hysteresis loop shown by FIG. 3, operating the PZT 130 back and forth across its operating range in an open loop mode posses a problem of knowing the precise position of the PZT 130 subsequent to the back and forth movement. A useful technique employed for mitigating the position problem in an open loop mode is to apply a fixed low end voltage, or lower limit voltage (not shown) and operate PZT 130 in one direction by increasing the voltage across the PZT 130 up to an upper operating limit voltage (not shown). To move to the read/write head 118 to a point between the low end voltage and the upper operating limit voltage, the voltage applied first to the PZT 130 is the low end voltage, to establish a known state of the PZT 130, and then sufficient voltage is applied to the PZT 130 to move to the desired destination.

Continuing with FIG. 3, another useful technique to employ when operating the PZT 130 in an open loop mode is to operate PZT 130 within a fixed starting and ending voltage, such that each time, the PZT 130 will follow the same hysteresis loop. In short, to accurately position a read/write head 118 using the PZT 130 in an open loop mode, it is recommended to use a hysteresis loop portion 160, as shown by the solid line, of the hysteresis loop 162, or conversely a hysteresis loop portion 164 of the hysteresis loop 162, but not both intermixed within an operation. For example, in a first preferred embodiment where the PZT 130 is being used to position a read/write head 118 during a servo write process and the servo tracks (not shown) are being written from an outer diameter (not shown separately) to an inner diameter (not shown separately) of the rotatable disc surface 106 (of FIG. 1), and a write element (not shown separately) of the read/write head 118 lies between a read element (not shown separately) of the read/write head 118 (of FIG. 1) and a center of rotation (not shown separately) of the rotatable disc surface 106. The hysteresis loop portion 160 of the hysteresis loop 162 shows the type of path that should be used, starting at the low end voltage and operating up to the upper operating limit voltage.

In a second preferred embodiment, where the PZT 130 is being used to position a read/write head 118 during a servo write process. And, the servo tracks (not shown) are being written from the inner diameter (not shown separately) to the outer diameter (not shown separately) of the rotatable disc surface 106 (of FIG. 1), and the write element (not shown separately) of the read/write head 118 lies between the read element (not shown separately) of the read/write head 118 (of FIG. 1) and outer diameter of the rotatable disc surface 106, the hysteresis loop portion 164 of the hysteresis loop 162 shows the type of path that should be used, starting at the upper operating limit voltage and operating down to the low end voltage.

For most of the operating range of the PZT 130, the hysteresis loop 162 is a curve instead of a straight line, which means when increasing the voltage applied to the PZT 130 within the operating range, and in sequentially equal increments, one may not get sequentially equal amounts of displacement. The displacement of PZT 130 is not linear to the voltage applied to the PZT. In measured instances, the variance between the displacement achieved along various portions of the hysteresis loop 162, in response to equally applied increments of voltage, can be can be as large as 20% of a pitch of a selected data track 120. In order to use PZT 130 as a linear displacement component of a servo write process, as well as a ruler for verifying the DC track spacing during a servo write process, linearizing the hysteresis loop 162 is suggested.

Figure 4:
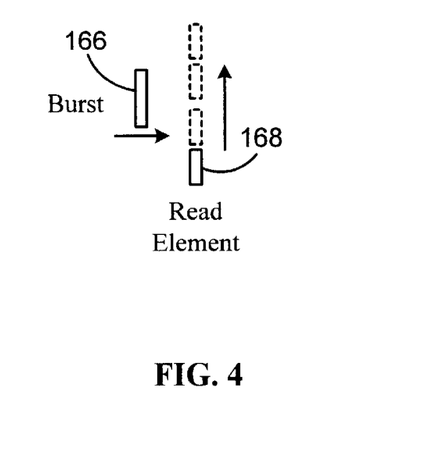
FIG. 4 is a plan view of a burst written to a rotatable disc surface of the disc drive of FIG. 1 in relation to a read element of a read/write head of the disc drive of FIG. 1.

FIG. 4 shows a characteristic burst 166 written to a selected area of the rotatable disc surface 106 by a write element (not shown) of the read/write head 118 (of FIG. 1). To linearize the characteristic hysteresis loop 162 (of FIG. 3) of the PZT 130 (of FIG. 1), a repeatable measurement standard or ruler is needed. In a servo write process a width of the burst 166 shown by FIG. 4 provides a useful ruler. After writing a burst 166 on a selected portion (not shown separately) of the data track 120 (of FIG. 1) of the rotatable disc surface 106 (of FIG. 1), a burst scan is performing by sweeping a reader element 168 of the read/write head 118 (of FIG. 1) across the data track 120 containing the written burst 166.

During the burst scan, the HSA 110 (of FIG. 1) is held stationary by the control circuit 142 (of FIG. 2) receiving position signals from the servo track, the rotatable disc 106 (of FIG. 1) rotates beneath the read/write head 118 (of FIG. 1) at a nominal speed of rotation and the PZT 130 (of FIG. 1) is consecutively operated between the low end voltage and the upper operating limit voltage, by starting at the low end voltage and incrementally adding a plurality of predetermined incremental voltage increases to the PZT 130. A read gate (not shown) communicating with the read element 168 remains open to pass amplitude readings for the portion of the each of the burst 166 the read element is over. Each of the amplitude readings is passed to the demodulator 146 (of FIG. 2) and the value store in a processor memory 158 (of FIG. 2) along with the count of the incremental voltage increases applied to the PZT 130 to that point in the process.

Each incremental voltage increase added to the voltage applied to the PZT 130 is passed through the ZOH 154 (of FIG. 2) from the DAC 153 (of FIG. 2). As each incremental voltage increase is added to the voltage level of PZT 130, a record of the event is kept in the form of a DAC count in the processor memory 158 (of FIG. 2). With each incremental voltage increase, the PZT 130 responds by advancing the read element 168 closer to the center of rotation of the rotatable disc surface 106 and the amplitude of the burst 166 read at that location and its associated DAC count is reported in the processor memory 158.

Figure 5:
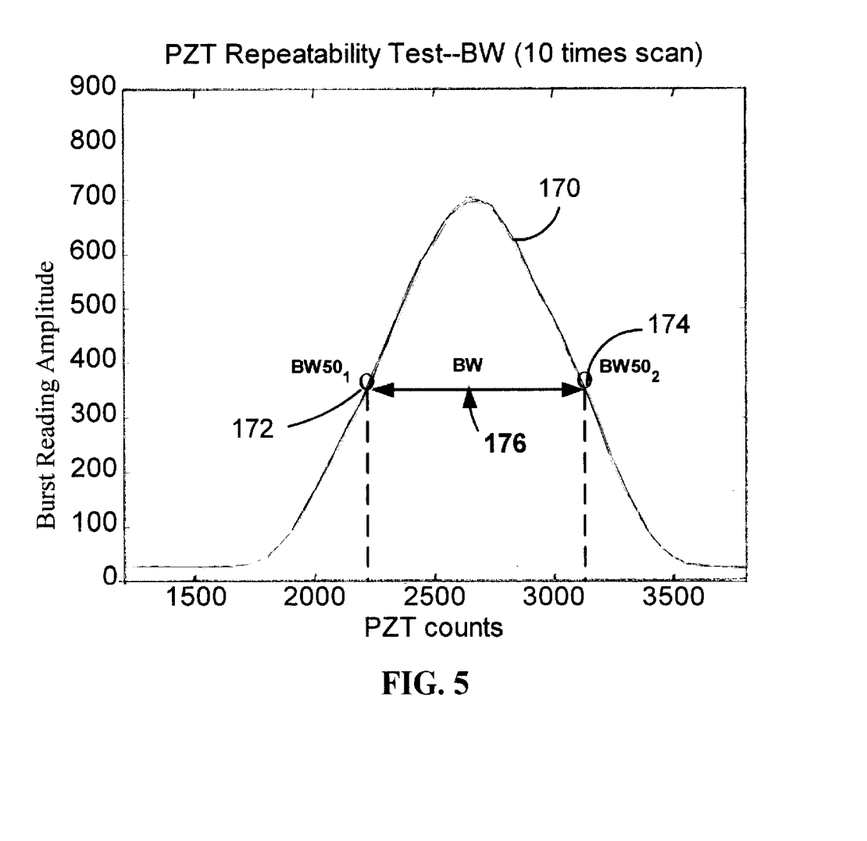
FIG. 5 is a graphical presentation of a burst width measurement test of a sequence of burst patterns written to the rotatable disc surface of FIG. 1 read by the read element of FIG. 4.

FIG. 5 shows the result of 10 repetitive burst scans of a single burst 166 (of FIG. 4) written to the rotatable disc surface 106. As shown by FIG. 5, the repeatability in width reported by each scan of the burst 166 is quite high. Each scan was made by holding the HSA 110 stationary while using the PZT 130 (of FIG. 1), operably coupled with the second selected head mounted on an independent actuator arm 114 (of FIG. 1), to scan the burst with the read element of the second selected head to measure the amplitude of the burst along the path of the scan. Each of the 10 burst scans began with the voltage supplied the PZT 130 (of FIG. 1) set at the fixed low end voltage (not shown) of the voltage operating range and incrementally increased a predetermined number of DAC counts up to the upper operating limit voltage the PZT.

Two points of a burst amplitude curve 170 are used to determine burst width. The two points selected for this purpose are the two points along the burst amplitude curve 170 at which the burst amplitude is 50% of the peak burst amplitude. These two points are designated as $BW50_1$ 172 and $BW50_2$ 174 and are designated and referred to as BW50 points.

If the PZT 130 were linear, the DAC count difference between $BW50_1$ 172 and $BW50_2$ 174 would give a Burst Width 176 (BW 176) in DAC counts, and regardless of the starting point along the hysteresis loop 162 (of FIG. 3), that a burst scan began, the determined BW 176 would not change, as each incremental voltage increase, of equal magnitude, would yield a displacement by the PZT 130 of equal amount. Unfortunately, PZT 130 (of FIG. 1) is non-linear. A BW 176 determined by the difference between $BW50_1$ 172 and $BW50_2$ 174 depends on the starting position of the PZT 130 along the hysteresis loop portion 160 of the hysteresis loop 162 relative to the burst 166.

Figure 6:
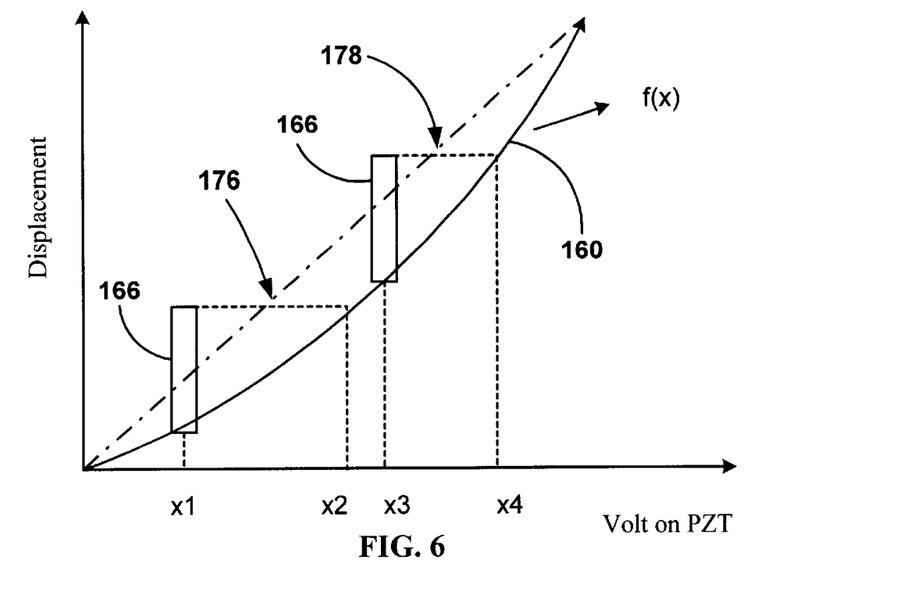
FIG. 6 is a graphical presentation of readings taken by the read element of FIG. 4 showing burst measurements at different points in a hysteresis curve of the microactuator of FIG. 1.

In FIG. 6, the BW 176 defined by the difference $x_2-x_1$ is obviously different from BW 178 defined by the difference $x_4-x_3$, although the burst width in both cases should be the same, as shown by FIG. 5, because the same burst 166 is being measured and re-measured by starting the read cycle of the burst scan at a different point along the hysteresis loop portion 160. The difference in reported width between BW 176 and BW 178 is a result of beginning a burst measurement of the burst 166 at different points along the hysteresis loop portion 160. By defining the hysteresis loop portion 160 as y=f(x), where x is the voltage (or DAC count) applied across the PZT 130 and y is the displacement of PZT 130 in response to the voltage applied. Then in FIG. 6:

$$f(x_2)-f(x_1)=f(x_4)-f(x_3)=BW \qquad (1)$$

The hysteresis loop function y=f(x) can be a very complex function. To simplify the computation, especially for DSP/microprocessor implementation, selecting a simple equation is preferred. Results from empirical testing show that a $3^{rd}$ order polynomial equation is sufficient to model the hysteresis curve 160 (of FIG. 3). The equation selected takes the form of:

$$f(x)=a_3x^3+a_2x^2+a_1x+a_0, \qquad (2)$$

By determining the constants for $a_3$ through $a_0$, for equation (2) a model for the PZT 130 (of FIG. 1) is derived.

Based on equation (1) and equation (2), one can form a model:

$$\begin{bmatrix} x_{1,2}^3-x_{1,1}^3 & x_{1,2}^2-x_{1,1}^2 & x_{1,2}-x_{1,1} \\ x_{2,2}^3-x_{2,1}^3 & x_{2,2}^2-x_{2,1}^2 & x_{2,2}-x_{2,1} \\ \cdots & \cdots & \cdots \\ x_{3,2}^3-x_{3,1}^3 & x_{3,2}^2-x_{3,1}^2 & x_{3,2}-x_{3,1} \end{bmatrix} \begin{bmatrix} a_3 \\ a_2 \\ a_1 \end{bmatrix} = \begin{bmatrix} BW \\ BW \\ \vdots \\ BW \end{bmatrix} \quad \text{Equation (3)}$$

To determine the required values for the constants of equation 2, a method of a first embodiment or first measurement method is employed. A disc drive 100 (of FIG. 1) with at least one servo track (not shown separately) written on at least one of a plurality of rotatable disc surfaces 106 (of FIG. 1) and having a plurality of read/write heads 118 (of FIG. 1) radially positionable and adjacent respective rotatable disc surfaces 106 (of FIG. 1) is selected. A first read/write head 118 (of FIG. 1) supported by a first actuator arm 114 (of FIG. 1) is positioned adjacent the servo track of a first rotatable disc surface 106 (of FIG. 1) servoing on a set-point of the servo track (not shown separately). The set-point, for example track center of the servo track, is used in a close loop operation to determine an amount of correction that may be needed to maintain a position of the HSA 110 (of FIG. 1) in a substantially fixed position relative to a center of rotation of the rotatable disc surface 106 (of FIG. 1).

With the HSA 110 in a substantially fixed position, a second read/write head 118 (not separately shown) supported by a second actuator arm 114 (not separately shown) and adjacent a second rotatable disc surface (not separately shown) is selected from the plurality of read/write heads 118. A write element (not shown separately) of the second selected head is used to write a burst pattern, such as an A burst, to the second rotatable disc surface.

It is noted that the read/write heads 118 (of FIG. 1) of the present invention are MR heads. Each head 118 includes a read element and a write element, wherein the write element leads the reading element across the surface of the rotatable disc 106 when the HSA 110 (of FIG. 1) is advancing the read/write heads 118 from an outer diameter of the rotatable disc surface 106 to an inner diameter of the rotatable disc surface 106. In other words, and all times the write element is positioned between the read element and the center of rotation of the rotatable disc 106 (of FIG. 1).

With the burst pattern 166 written to the second selected rotatable disc surface 106, a series of BW 50 data point sets, $x_{1,k}$ and $x_{2,k}$ expressed in PZT DAC counts are obtained and used to populate the matrix of Equation (3). To obtain the series of BW 50 data points, the first selected head 118 (of FIG. 1) is sequentially reset to a plurality of predetermined successive set-points beginning at an outside diameter of the selected servo track and concluding at an inner diameter of the selected servo track. The number of set-points selected must be sufficient to provide the needed BW 50 data point sets to fill the matrix of Equation (3), which of course depends on the an equation selected to model the PZT 130 (of FIG. 1). In a preferred embodiment the third order polynomial equation of equation (2) is selected.

With a first selected head 118 (of FIG. 1) position-controlling HSA 110 (of FIG. 1) relative to the first selected set-point adjacent the outer diameter of the servo track, a burst scan is performed on the burst written by the second selected head and a first pair of the BW 50 data points are obtained, the HSA 110 (of FIG. 1) is repositioned to the next set-point of servo track and a second pair of BW 50 data points is obtained. This procedure is continued at each of the subsequent set-points across the servo track used for the burst scan measurement process. Each burst scan begins with a voltage supplied the PZT 130 (of FIG. 1) set at the fixed low end voltage (not shown) of the voltage operating range of the PZT 130. The voltage applied across the PZT 130 is incrementally increased by a predetermined number of DAC counts up to the upper operating limit voltage the PZT. Because the HSA 110 (of FIG. 1) moves progressively closer to the center of rotation of the rotatable disc surface 106 (of FIG. 1) with each progressive advancement of the HSA 110 to a successive set-point on the servo track, the read element of the second selected head moves closer to a leading edge of the amplitude curve defining the burst pattern 166 written to the second rotatable disc surface 106 (not separately shown).

With the read element of the second selected head 118 positioned closer to the burst pattern 166 at the start of a burst scan, the read element encounters an amplitude reading of the burst pattern at an earlier point in time during the burst scan. By encountering the leading edge of the burst pattern 166 earlier in the burst scan, less of the displacement capabilities of the PZT 130 (of FIG. 1) is needed to obtain each subsequent pair of BW 50 values. In other words, the first of the pair of BW 50 value pairs obtained is done so with the PZT 130 (of FIG. 1) at its maximum extension for any of the measured BW 50 value pairs and at its minimum extension when acquiring the last BW50 value pairs, as compared to any of the other acquired BW 50 value pairs.

In an alternate or second measurement method, the BW50 data point pairs $x_{1,k}$ and $x_{2,k}$ are obtained by servoing on the first selected head while writing the "A" burst with the second selected head while the PZT voltage set at the low end voltage. While holding the HSA 110 (of FIG. 1) substantially fixed, the PZT 130 is biased with an additional percentage of the operating voltage range of the PZT 130, which positions the write element of the second selected head 118 (not separately shown) closer to the center of rotation of the rotatable disc surface 106 (of FIG. 1) and a second burst, such as a "B" the burst is written to the rotatable disc surface 106 (of FIG. 1) adjacent the "A" burst. This procedure, i.e., writing successive burst patterns radially offset and adjacent prior written burst patterns using the PZT 130 to advance the write element of the second selected read/write head 118 (not shown separately), continues through the operating range of the PZT 130 and results in the formation of a burst track (not separately shown). The PZT is then reset to the low end voltage and a burst scan is performed by sweeping the reader element 168 (of FIG. 4) of the read/write head 118 (of FIG. 1) across the burst track containing the sequence of bursts written to the burst track, to obtained the BW50 data point pairs, $x_{1,k}$ and $x_{2,k}$, for each of the burst types written to the burst track. In other words, as the burst track rotates beneath the read element of the second selected head 118 (not separately shown), the read element takes an amplitude measurement and records an amplitude reading for each of the burst types encountered relative to the DAC count accumulated to that point in time. From the readings taken the BW50 data point pairs, $x_{1,k}$ and $x_{2,k}$, are determined.

It is noted that implicit with this measurement method an assumption is made regarding an ability of the write element of the second selected read/write head 118 (not separately shown) to consecutively write a given burst pattern of equal width around the circumference of the rotatable disc surface 106 at a given and radial distance from the center of rotation of the rotatable disc surface 106 (not separately shown) and that each burst pattern, of a specific burst type, is substantially equal in amplitude and width as each of the other burst patterns, of that type, written at that circumference. This assumption permits the collection of measurements used in determining the BW 50 data point pairs, $x_{1,k}$ and $x_{2,k}$, in the fewest number of rotations of the burst track beneath the read element of the second selected head 118 (not separately shown).

Again, the obtained BW 50 data point pairs, $x_{1,k}$ and $x_{2,k}$, are used to populate the matrix of Equation (3) to derive the constants $a_3$ through $a_0$, for equation (2).

Equation (3) is a standard linear least squares problem and can be solved easily. BW is the nominal burst width. The value is not critical to DC track spacing variation in servo write processes, as long as BW in equation (3) is a constant. And, $a_0$ in equation (2) can be determined by boundary condition, say f(0)=0.

Figure 7:
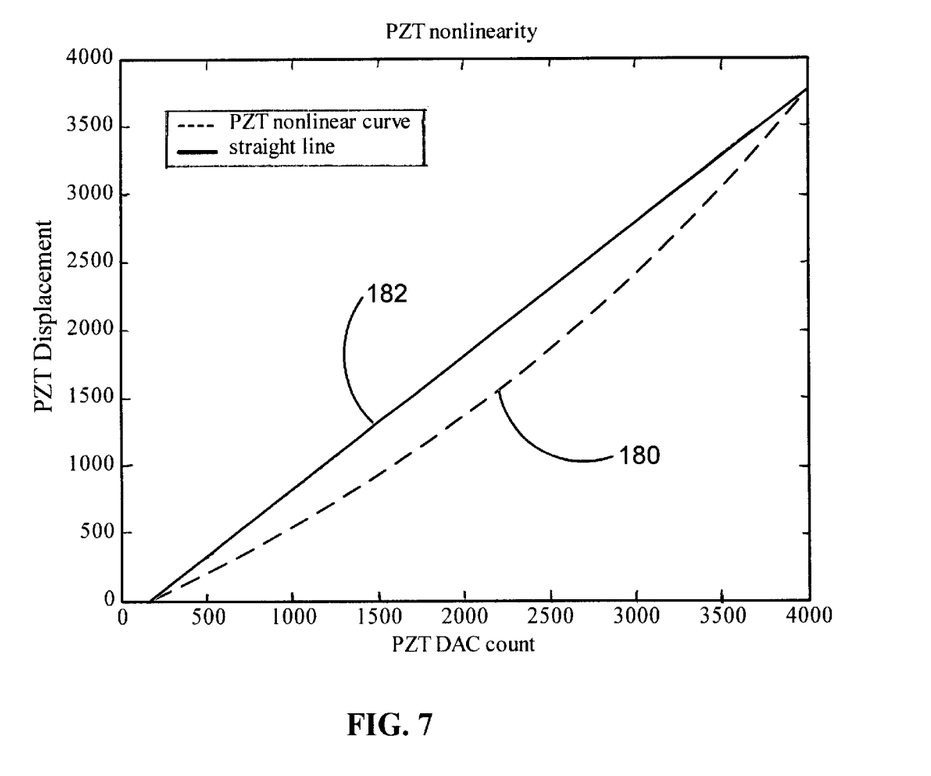
FIG. 7 is a graphical presentation of a non-linearity in response of the microactuator responding to an applied voltage of FIG. 1.
Figure 8:
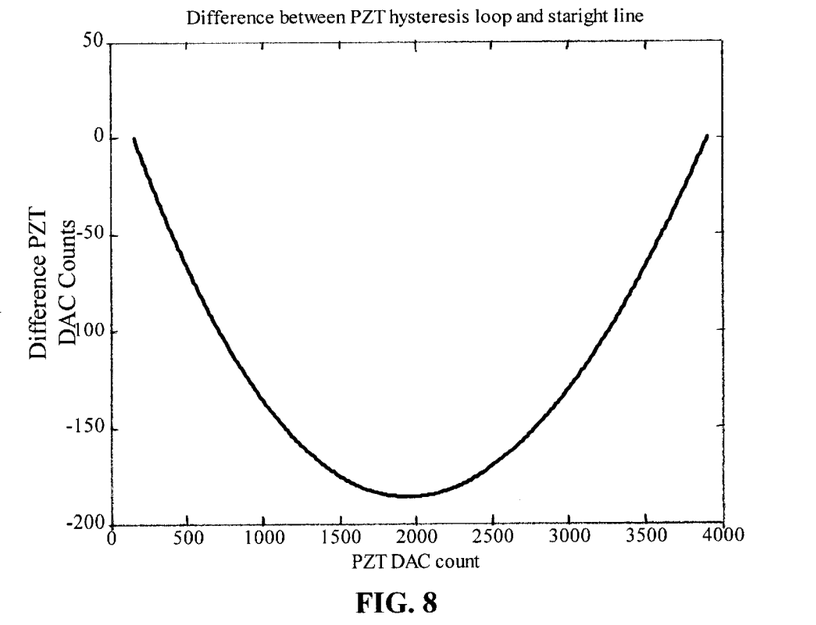
FIG. 8 is a graphical presentation of a difference in a piezoelectric transducer (PZT) digital to analog converter (DAC) count between a linear response and the non-linearity in response of the microactuator responding to an applied voltage of FIG. 7.

FIG. 7 shows a typical result of the PZT 130 (of FIG. 1) hysteresis curve 180 for a typical disc drive 100 (of FIG. 1) incorporating the PZT 130. Using the above identified first measurement method; a PZT linearity test was performed on the disc drive 100. In the test, the PZT count started from 150 and ended at 3900. The difference between the hysteresis curve 180 and the straight line 182, which represents the linear case, is shown in FIG. 8. The test measurements showed the BW is typically around 800~1000 PZT counts, which implies that the hysteresis curve 180 (of FIG. 7), which is the function y=f(x), may deviate from the straight line 182 (of FIG. 7) by as much as large as 20%, as shown by FIG. 8.

In solving equation (3), $a_3$~$a_0$ for the test case were: −2.6882e−009, 6.9604e−005, 0.7504 and −113.8688 respectively. Because the number range is too large for a fix point processor to handle, the x in equation (2) was scaled-down by n, yielding $$f(x)/n = \hat{a}_3(x/n)^3 + \hat{a}_2(x/n)^2 + \hat{a}_1(x/n) + \hat{a}_0, \quad (4)$$

where n=4096 and the new $\hat{a}_3$~$\hat{a}_0$ were −0.0451, 0.2851, 0.7504 and −0.0278 respectively, which are much easier using a 16Q15 data format to encode.

Continuing with the test, and using the values of −0.0451, 0.2851, 0.7504 and −0.0278 respectively for $\hat{a}_3$~$\hat{a}_0$ within equation (4) the following results were obtained. While using the first measurement method described hereinabove without the values of −0.0451, 0.2851, 0.7504 and −0.0278 respectively for $\hat{a}_3$~$\hat{a}_0$ within equation (4), the measured BW, the difference between BW $50_1$ and BW $50_2$, of the burst was found to be 884 DAC counts, while the second measured BW of the burst was found to be 749 DAC counts. The BW difference is (884−749)*100/884=15%. Next, the PZT 130 was reset to the low end voltage, and applying the values of −0.0451, 0.2851, 0.7504 and −0.0278 respectively for $\hat{a}_3$~$\hat{a}_0$ within equation (4) to the PZT 130 during the PZT scan, the measurements were repeated. The measured BW of a first and second burst scan were found to be 844 and 850 respectively. The difference is (850−844)*/850=0.7%.

In a second phase of testing, the test was repeated using the alternate or second measurement method described hereinabove. The first selected read/write head 118 was positioned on a servo track (not shown) to provide servo information for holding the HSA 110 substantially stationery while the second selected head wrote 5 burst pattern types to the selected second rotatable disc surface 106 rotating beneath the write element of the second selected read/write head 118 (not separately shown), with each burst type written at a different PZT offset to form the burst track. A burst scan was then executed on the burst track. All the bursts of a given type should have the same burst width, since they are written by the same read/write head 118 (not separately shown) at the same radial distance from the center of rotation of the rotatable disc surface 106 rotating beneath the write element of the second selected read/write head 118 (not separately shown).

Figure 9:
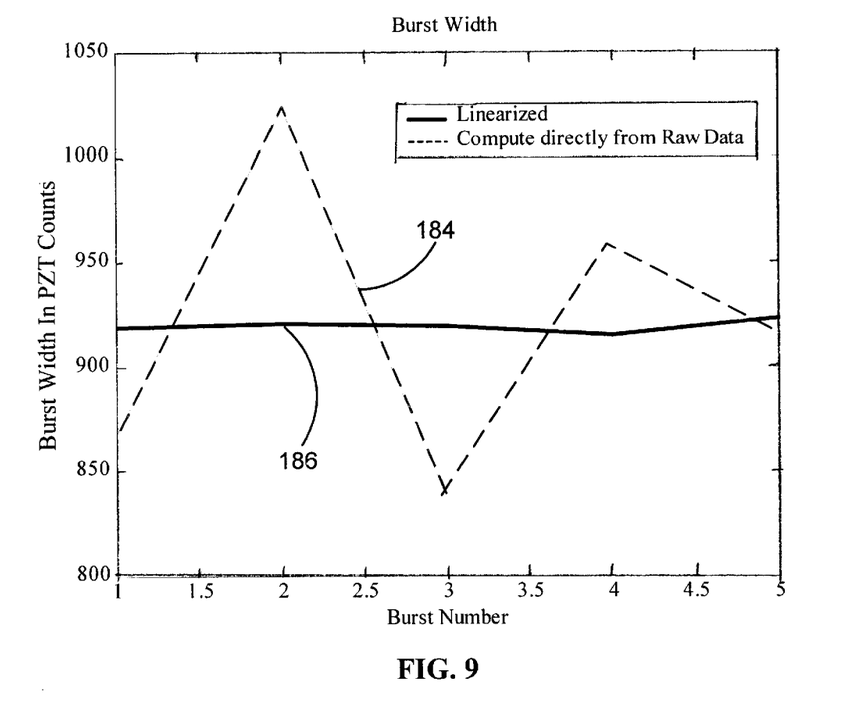
FIG. 9 is a graphical presentation of a non-linearized PZT DAC count of the microactuator responding to an applied voltage of FIG. 7 compared to a linearized PZT DAC count in response to the applied voltage of FIG. 7.

FIG. 9 shows a BW50 curve 184 resulting from measurements of the five bursts absent application the y=f(x) linearization function to the PZT 130 (of FIG. 1). The BW50 curve 184 the BW50 values change from 836~1023, with 3-sigma=221 or 221/920=24.0% of the average burst width. However, after applying the y=f(x) linearization function to the PZT 130 and redoing the burst scan, BW50 curve 186 results, with a variation in burst widths of 915~923, resulting in a 3-sigma deviation of 8.4 or 8.4/920=0.91% of the average burst width.

The model and methods described to this point are useful in making measurements of relationships within the disc drive 100 (of FIG. 1) such as measuring DC track spacing during a servo write processes. To utilize the PZT 130 (of FIG. 1) as a positioner to position a selected read/write head 118 (of FIG. 1) relative to the rotatable disc surface 106 (of FIG. 1), one also needs to know the number of PZT counts for driving the PZT 130 a specified distance. This is the reverse problem of using the PZT 130 as measurement tool, and an inverse function, x=g(y), of y=f(x) is needed. However, the inverse function, x=g(y) results in a very complex form. To simplify the computation of x=g(y) inverse function, a second equation, in a simple form is selected for the computation. The order for the second selected equation is a 4th order polynomial equation in the form of:

$$x = g(y) = b_4 y^4 + b_3 y^3 + b_2 y^2 + b_1 y + b_0. \quad (5)$$

From above, y=f(x) is known. For any given set of x, a set of y can be computed using the function y=f(x) by using the values of −0.0451, 0.2851, 0.7504 and −0.0278 respectively for $\hat{a}_3$~$\hat{a}_0$ within equation (4). Apply the set of x and y to equation (5) a set of equations will be obtained, from which $b_4$~$b_0$ can be solved using the linear least square method. Using the values of −0.0451, 0.2851, 0.7504 and −0.0278 respectively for $\hat{a}_3$~$\hat{a}_0$ within equation (4) from above, $b_4$~are −0.1065, 0.3352, −0.5236, 1.2900, 0.0368 respectively.

In testing the model, a series of ABCDABCD bursts were written to the rotatable disc surface 106 (of FIG. 1) at an equal increment in PZT displacement computed by equation (5) followed by a burst scan. The burst scan results for track spacing are shown in Table 1. If DC track spacing is computed using the differences between A–C (or B–D) zero crossings, using non-linearized PZT counts directly, the $3^{rd}$ column in the Table 1 is obtained, where 3-sigma is 23% of the BW. Using the values of −0.0451, 0.2851, 0.7504 and −0.0278 respectively for $\hat{a}_3$~$\hat{a}_0$ within equation (4), the DC track spacing is listed in the $2^{nd}$ column in Table 1, where 3-sigma is about 2.3%.

TABLE 1

Track Spacing Test Results

|  | Use PZT Linearized Method | Direct Compute from PZT Counts |
|---|---|---|
| AC null to CA null | 821 | 909 |
| CA null to AC null | 806 | 806 |
| BD null to DB null | 815 | 756 |
| DB null to BD null | 817 | 858 |
| 3-sigma | 19 count or 2.3% of BW | 197 count or 23.7% of BW |

Figure 10:
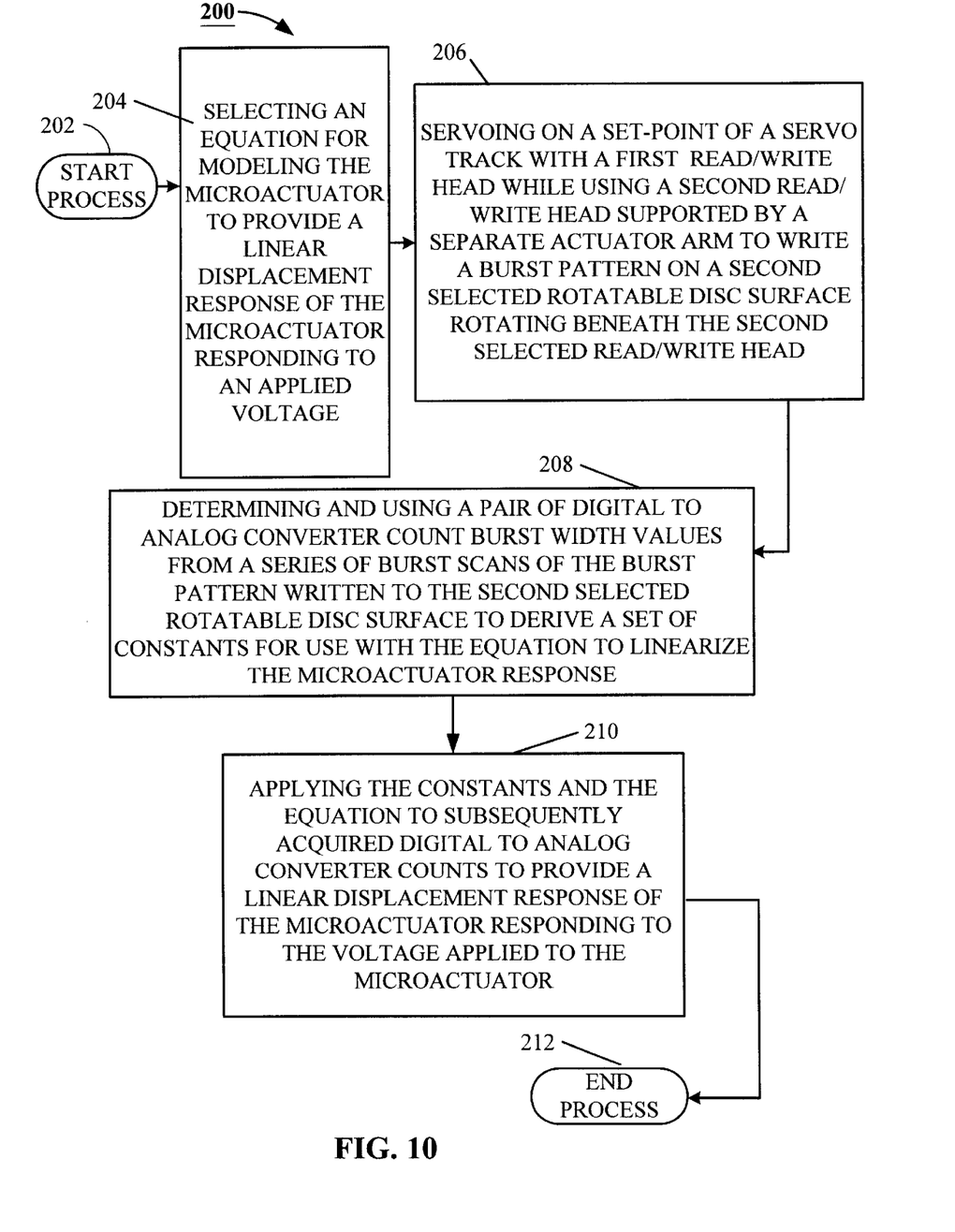
FIG. 10 is a flow diagram showing steps for applying a first embodiment for linearizing microactuator response hysteresis for the disc drive of FIG. 1.

FIG. 10 shows a flow diagram of a PZT linearization process 200 used for modeling and linearizing a non-linear hysteresis loop response of a microactuator (such as 130). The linearization process 200 starts at start process step 202 and continues with step 204. At process step 204, a polynomial equation modeling the response characteristics of a microactuator responding to an applied voltage is selected. To apply the model to functions of a disc drive (such as 100), a set of constants for use with the selected polynomial equation is determined by succeeding process steps.

The linearization process 200 continues with process step 206 where a first selected read/write head (such as 118) is used to servo on a set-point of a servo track while a second selected read/write head (such as 118) supported by a second actuator arm (such as 114) writes a burst pattern to a rotatable disc surface (such as 106) rotating beneath the second selected read/write head of the disc drive.

In process step 208 of the linearization process 200 a pair of digital to analog converter count burst width values from each of a series of burst scans of the burst pattern written to the rotatable disc surface by process step 206 are written to a processor memory (such as 158) along with a count of a number of DAC counts encountered to that point in process. The pairs of digital to analog converter counts burst width values are used to derive the set of constants, which are used in conjunction with the polynomial equation to linearize a displacement response of a microactuator responding to a voltage applied to the microactuator.

Process step 210 of the linearization process 200 applies the set of constants derived by process step 208 in conjunction with the polynomial equation to sequentially acquired digital analog conversion counts to provide a linear displacement response of the microactuator responding to an applied voltage of known value. The linearization process 200 concludes at end process step 212.

Figure 11:
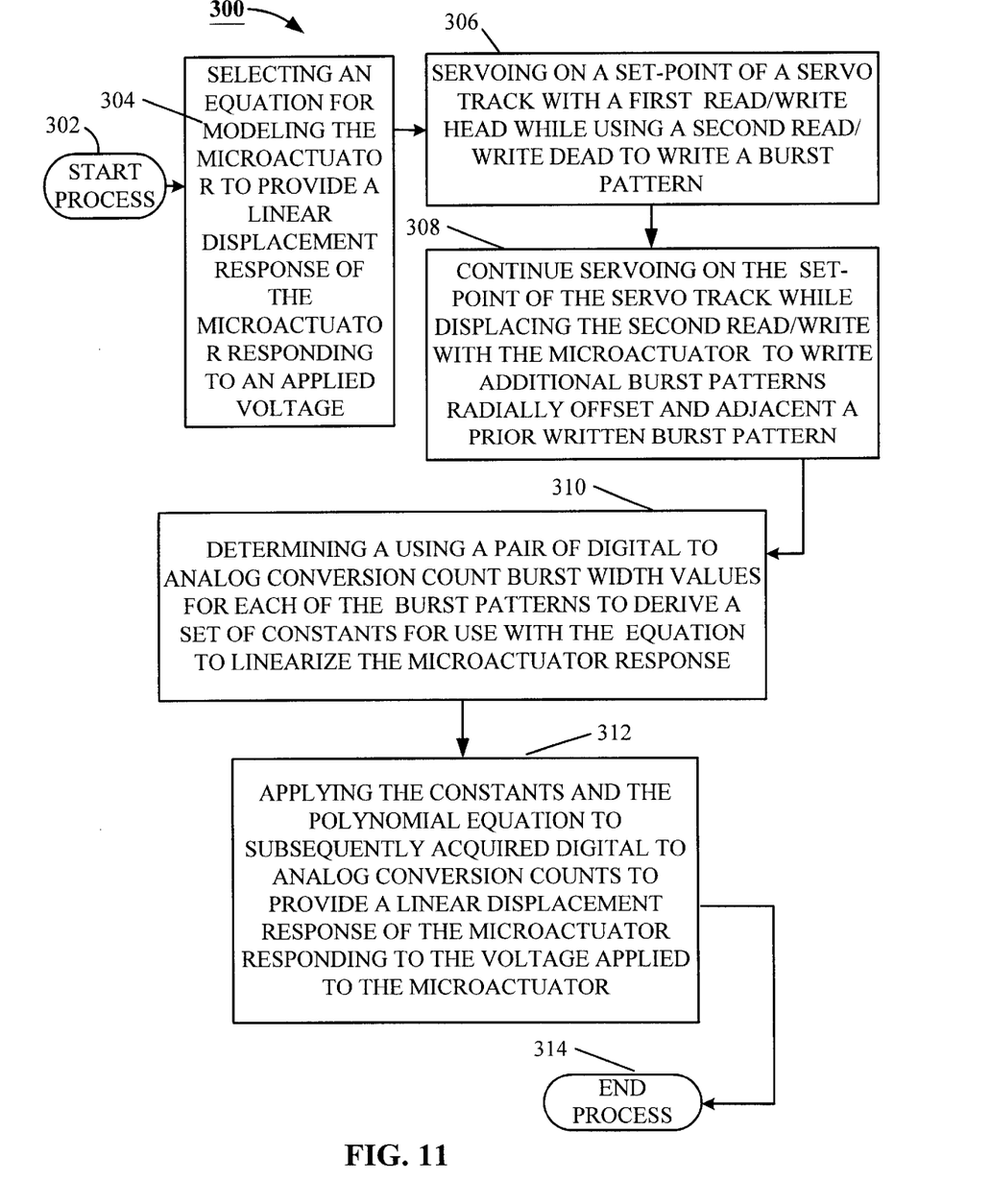
FIG. 11 is a flow diagram showing steps for applying a second embodiment for linearizing microactuator response hysteresis for the disc drive of FIG. 1.

FIG. 11 shows a flow diagram of an alternate embodiment of a PZT linearization process 300 used for modeling and linearizing a non-linear hysteresis loop response of a microactuator (such as 130). The PZT linearization process 300 starts at start process step 302 and continues with step 304. At process step 304, a polynomial equation modeling the response characteristics of a microactuator responding to an applied voltage is selected. To apply the model to functions of a disc drive (such as 100), a set of constants for use with the selected polynomial equation is determined by succeeding process steps.

The linearization process 300 continues with process step 306 where a first selected read/write head (such as 118) is used to servo on a set-point of a servo track, while a second selected read/write head (such as 118) writes a burst pattern to a rotatable disc surface (such as 106) of the disc drive. Continuing with process step 308 of the linearization process 300, the first selected head continues to servo on the set-point of the servo track while the second selected read/write head is sequentially displaced by the microactuator so that additional burst patterns can be written to the rotatable disc surface, radially offset and adjacent to a prior written burst pattern, wherein the prior written burst pattern for the first additional burst pattern is the burst pattern written to the rotatable disc surface in process step 306, the prior written pattern for a second additional burst pattern is the first additional burst pattern written in process step 308 and so on for all remaining additional burst patterns.

In process step 310 of the PZT linearization process 300, a pair of digital to analog converter count burst width values for each of the burst patterns written to the rotatable disc surface by process steps 306 and 308 is determined. The pairs of digital to analog converter counts burst width values are used to derive the set of constants, which are used in conjunction with the polynomial equation to linearize a displacement response of a microactuator responding to a voltage applied to the microactuator.

Process step 312 of the linearization process 300 applies the set of constants derived by process step 310 in conjunction with the polynomial equation to sequentially acquired digital analog conversion counts to provide a linear displacement response of the microactuator responding to an applied voltage of known value. The linearization process 300 concludes at end process step 314.

Figure 12:
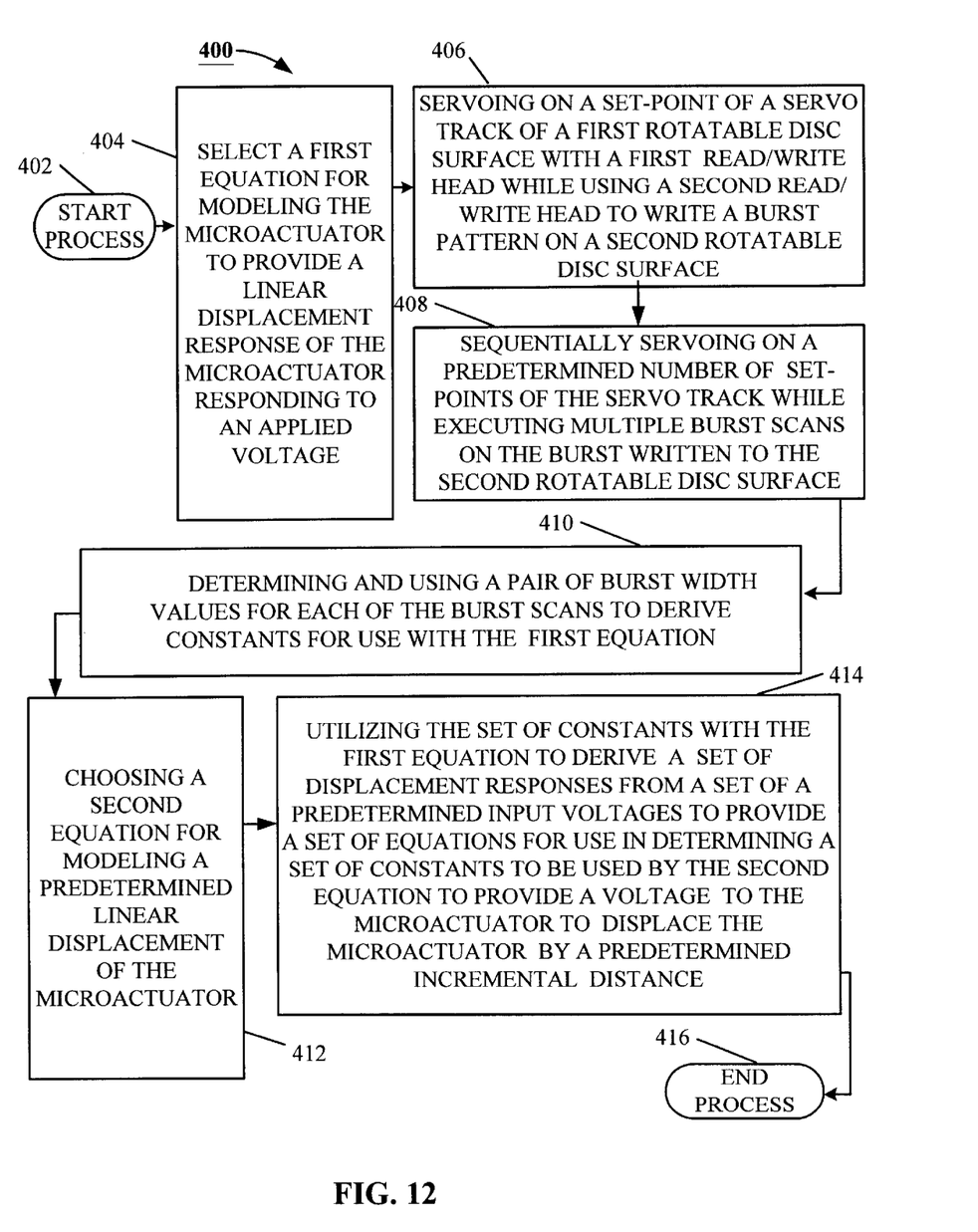
FIG. 12 is a flow diagram showing steps for linearizing a displacement of the microactuator of a disc drive of FIG. 1.

FIG. 12 shows a flow diagram of a calibration process 400 for linearizing a displacement of a microactuator (such as 130) of a disc drive (such as 100) used for providing a linearizing displacement from the non-linear microactuator displaying a hysteresis loop displacement response in response to an application of a voltage level determined by a model (such as Equation 5). The calibration process 400 starts at start process step 402 and continues with step 404. At process step 404, a first polynomial equation modeling the response characteristics of a microactuator responding to an applied voltage selected. To apply the model two functions of a disc drive, a set of constants for use with the first selected polynomial equation is determined by succeeding process steps.

The calibration process 400 continues with process step 406 where a first selected read/write head (such as 118) is used to servo on a set-point of a servo track, while a second selected read/write head (such as 118) writes a burst pattern to a rotatable disc surface (such as 106) of the disc drive. Continuing with process step 408 of the calibration process 400, the first selected head is sequentially positioned on each of a series of predetermined set-points while the second selected head executes a series of burst scans on the burst written to the rotatable disc surface rotating beneath the second selected head to provide a set of burst width value pairs used in determining a burst width expressed in digital to analog converter count for each of the burst width value pairs measured.

In process step 410 of the calibration process 400, each of the pairs of digital to analog converter count burst width values measured in process step 408 are used to derive the set of constants, which are used in conjunction with the first selected polynomial equation to linearize a displacement response of a microactuator responding to a voltage applied to the microactuator.

Process step 412 of the calibration process 400 entails choosing a second polynomial equation for modeling a predetermined linear displacement of the microactuator. Continuing with process step 414 of the calibration process 400 by utilizing the set of constants derived in process step 410 with the first polynomial equation to derive as set of displacement responses from a set of a predetermined input voltages yields the set of variables for use with the second polynomial equation to produce a set of simultaneous equations for use in determining a set of constants to be used by the second equation to provide a voltage to the microactuator to displace the microactuator a predetermined distance. The calibration process 400 concludes at end process step 416.

In accordance with one aspect of a preferred embodiment, steps performed include: selecting a polynomial equation for modeling the microactuator to provide a linear displacement response of the microactuator responding to an applied voltage, such as step 204; servoing on a set-point of a servo track with a first read/write head while using a second read/write head supported by a separate actuator arm to write a burst pattern on a second selected rotatable disc surface rotating beneath the second selected read/write head, such as step 206; determining and using a pair of digital to analog converter count burst width values from a series of burst scans of the burst pattern written to the second selected rotatable disc surface to derive a set of constants for use with the polynomial equation to linearize the microactuator response, such as step 208; and applying the constants and the polynomial equation to subsequently acquired digital to analog converter counts to provide a linear displacement response of the microactuator responding to the voltage applied to the microactuator, such as step 210.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. In addition, although the preferred embodiment described herein is directed to a method for linearizing microactuator hysteresis for a disc drive system, it will be appreciated by those skilled in the art that the teachings of the present invention can be applied to other systems without departing from the scope and spirit of the present invention.

What is claimed is:

1. A method for linearizing a non-linear hysteresis loop displacement response of a microactuator of a disc drive by steps comprising:
    (a) selecting an equation for modeling the microactuator to provide a linear displacement response of the microactuator responding to an applied voltage;
    (b) servoing on a set-point of a servo track with a first read/write head supported by a first actuator arm while using a second read/write head supported by a second actuator arm to write a burst pattern on a second selected rotatable disc surface rotating beneath the second selected read/write head;
    (c) determining and using a pair of digital to analog converter count burst width values from a series of burst scans of the burst pattern written to the second selected rotatable disc surface to derive a set of constants for use with the equation to linearize the microactuator response; and
    (d) applying the constants and the equation to subsequently acquired digital to analog converter counts to provide a substantially linear displacement response of the microactuator responding to the voltage applied to the microactuator.

2. The method of claim 1 in which the microactuator is a piezoelectric transducer.

3. The method of claim 1 in which the equation is a third order polynomial equation.

4. The method of claim 1 in which the servoing step (b) comprising steps of:
    (b1) positioning the first selected read/write head supported by a first actuator arm adjacent the servo track of the first rotatable disc surface using a head stack assembly controlled by a servo control circuit to align the first selected read/write head adjacent the servo track, the servo control circuit responding to a measured position of the first selected read/write head relative to the set-point;
    (b2) reading a position signal of the first servo track with the first selected head to provide position information to the servo control circuit for position-controlling the first selected head substantially stationery relative to the set-point of the servo track while writing the burst pattern on the second selected rotatable disc surface rotating beneath the second selected read/write head;
    (b3) realigning the first selected read/write head adjacent a first of a plurality of a predetermined sequence of set-points of the servo track and position-controlling, the first selected read/write head substantially stationery relative to the first of the plurality of the predetermined sequence of set-points of the servo track while executing a burst scan on the burst written to the second selected rotatable disc surface rotating beneath the second selected read/write by incrementally increasing a voltage applied to the microactuator;
    (b4) recording a plurality of amplitude measurements of the burst pattern written to the second selected rotatable disc surface rotating beneath the second selected read/write head along with the number of incremental increases in voltage applied to the microactuator associated with each of the plurality of amplitude measurements; and
    (b5) repeating process steps (b3) and (b4) until each of the plurality of the predetermined sequence of set-points of the servo track have been processed.

5. The method of claim 4 in which the equation of selecting step (a) is a polynomial equation, a burst track is formed on the second rotatable disc surface via completion of the servoing step (b) and in which the determining step (c) comprising steps of:
    (c1) reading the plurality of amplitude measurements along with the number of incremental voltage increases applied to the microactuator associated with each of the plurality of amplitude measurements burst width values recorded by recording step (b4) for use in determining the pair of digital to analog converter count burst width values for each of the series of burst scans;
    (c2) determining the pair of digital to analog converter count burst width values for each of the series of burst scans by identifying a number of incremental voltage increases applied to the microactuator corresponding to each of two points of an amplitude each having one half the amplitude of a peak amplitude of the burst pattern;
    (c3) utilizing each pair of burst width values to populate variable cells of a matrix of a third order linear least squares problem; and
    (c4) deriving a set of constants for use with the polynomial equation to provide a linear displacement response of the microactuator in digital to analog conversion counts based on the voltage applied to the microactuator.

6. The method of claim 2 in which the servoing step (b) comprising steps of:
    (b1) positioning the first selected read/write head supported by a first actuator arm adjacent the servo track of the first rotatable disc surface using a head stack assembly controlled by a servo control circuit to align the first selected read/write head adjacent the servo track, the servo control circuit responding to a measured position of the first selected read/write head relative to the set-point;
    (b2) reading a position signal of the first servo track with the first selected head to provide position information to the servo control circuit for position-controlling the first selected head substantially stationery relative to the set-point of the servo track while writing the burst pattern on the second selected rotatable disc surface rotating beneath the second selected read/write head;
    (b3) realigning the first selected read/write head adjacent a first of a plurality of a predetermined sequence of set-points of the servo track and position-controlling, the first selected read/write head substantially stationery relative to the first of the plurality of the predetermined sequence of set-points of the servo track while executing a burst scan on the burst written to the second selected rotatable disc surface rotating beneath the second selected read/write by incrementally increasing a voltage applied to the microactuator;
    (b4) recording a plurality of amplitude measurements of the burst pattern written to the second selected rotatable disc surface rotating beneath the second selected read/write head along with the number of incremental increases in voltage applied to the microactuator associated with each of the plurality of amplitude measurements; and (b5) repeating process steps (b3) and (b4) until each of the plurality of the predetermined sequence of set-points of the servo track have been processed.

7. The method of claim 6 in which the equation of selecting step (a) is a polynomial equation, a burst track is formed on the second rotatable disc surface via completion of the servoing step (b) and in which the determining step (c) comprising steps of:

(c1) reading the plurality of amplitude measurements along with the number of incremental voltage increases applied to the microactuator associated with each of the plurality of amplitude measurements burst width values recorded by recording step (b4) for use in determining the pair of digital to analog converter count burst width values for each of the series of burst scans;

(c2) determining the pair of digital to analog converter count burst width values for each of the series of burst scans by identifying a number of incremental voltage increases applied to the microactuator corresponding to each of two points of an amplitude each having one half the amplitude of a peak amplitude of the burst pattern;

(c3) utilizing each pair of burst width values to populate variable cells of a matrix of a third order linear least squares problem; and (c4) deriving a set of constants for use with the polynomial equation to provide a linear displacement response of the microactuator in digital to analog conversion counts based on the voltage applied to the microactuator.

8. A method for linearizing a non-linear hysteresis loop displacement response of a microactuator of a disc by steps comprising:

(a) selecting an equation for modeling a linear displacement response of the microactuator responding to an applied voltage;

(b) servoing with a first selected read/write head of the disc drive relative to a set-point of a servo track of a first rotatable disc surface of the disc drive while writing a first of a predetermined plurality of burst patterns on a second rotatable disc surface of the disc drive using a second selected read/write head of the disc drive;

(c) maintaining the first selected head substantially stationery relative to the set-point of the servo track while sequentially displacing the second selected head by a predetermined number of a digital to analog conversion count using the microactuator while concurrently using the second selected read/write head for writing each of the remaining burst patterns radially offset and adjacent a prior written burst pattern;

(d) determining a using a pair of burst width values, each expressed as a digital to analog conversion count, for each of the predetermined plurality of burst patterns to derive a set of constants for use with the equation for linearizing the microactuator response; and (e) applying the constants and the equation to subsequently acquired digital to analog conversion counts to provide a linear displacement response of the microactuator responding to the voltage applied to the microactuator.

9. The method of claim 8 in which the microactuator is a piezoelectric transducer and in which the equation is a third order polynomial equation.

10. The method of claim 8 in which the servoing step (b) comprising steps of:

(b1) positioning the first selected read/write head adjacent the servo track of the first rotatable disc surface using a head stack assembly controlled by a servo control circuit to align the first selected read/write head adjacent the servo track;

(b2) repositioning the first selected read/write head adjacent the set-point of the servo track to position the second selected read/write head adjacent an outer boundary of a burst track of the second rotatable disc surface; and (b3) reading a position signal of the set-point with the first selected head to provide position information to the servo control circuit for position-controlling the first selected head substantially stationery relative to the set-point of the servo track while writing the first of the predetermined plurality of burst patterns adjacent the outer boundary of the burst track.

11. The method of claim 8 in which subsequently displacing the second selected head of maintaining step (c) comprising steps of:

(c1) selecting and setting a low-end voltage of a voltage range and an upper operating limit voltage of the voltage range for the microactuator for use in positioning the second selected read/write head for writing the remaining predetermined burst patterns;

(c2) providing a predetermined voltage within the voltage range of the microactuator, the voltage based on a number of digital to analog conversion counts supplied to a microactuator driver to position the second selected read/write head radially offset and adjacent the first of the predetermined plurality of burst patterns for writing a subsequent burst pattern radially offset and adjacent the first of the predetermined plurality the a burst patterns;

(c3) increasing the predetermined voltage to a voltage within the voltage range of microactuator for use by the microactuator driver to position the second selected read/write head radially offset and adjacent the subsequent burst pattern for writing a next subsequent burst pattern radially offset and adjacent a prior subsequent burst pattern of the predetermined plurality of burst patterns written to the second rotatable disc surface; and (c4) repeating increasing step (c3) until each of the predetermined plurality of burst patterns have been written to the second rotatable disc surface.

12. The method of claim 8 in which a burst track is formed on the second rotatable disc surface via completion of the maintaining step (c) and in which the determining step (d) comprising steps of:

(d1) maintaining the first selected read/write head substantially stationery and adjacent the set-point of the servo track subsequent to formation the burst track;

(d2) applying a low-end of a voltage range to the microactuator to position the second selected head adjacent an outer boundary of the burst track;

(d3) performing a burst scan across the burst track by applying incremental increases in voltage from the low-end voltage through to an upper operating limit voltage of the microactuator while reading and recording an amplitude profile, in digital to analog conversion counts, for each of the predetermined plurality of burst patterns as the burst track rotates at a nominal speed adjacent the second selected head;

(d4) analyzing each of the amplitude profiles to determine a digital to analog conversion count corresponding to a 50 percent amplitude value of the amplitude profile on an amplitude increasing portion of the amplitude profile and a digital to analog conversion count corresponding to a 50 percent amplitude value of the amplitude profile on an amplitude decreasing portion of the amplitude profile to provide the pair of burst width values for each of the predetermined plurality of burst patterns;

(d5) utilizing each pair of burst width values to populate variable cells of a matrix of a third order linear least squares problem; and (d6) deriving a set of constants for use with the equation to provide a linear displacement response of the microactuator in digital to analog conversion counts based on the voltage applied to the microactuator.

13. The method of claim 9 in which the servoing step (b) comprising steps of:

(b1) positioning the first selected read/write head adjacent the servo track of the first rotatable disc surface using a head stack assembly controlled by a servo control circuit to align the first selected read/write head adjacent the servo track;

(b2) repositioning the first selected read/write head adjacent the set-point of the servo track to position the second selected read/write head adjacent an outer boundary of a burst track of the second rotatable disc surface; and (b3) reading a position signal of the set-point with the first selected head to provide position information to the servo control circuit for position-controlling the first selected head substantially stationery relative to the set-point of the servo track while writing the first of the predetermined plurality of burst patterns adjacent the outer boundary of the burst track.

14. The method of claim 9 in which subsequently displacing the second selected head of maintaining step (c) comprising steps of:

(c1) selecting and setting a low-end voltage of a voltage range and an upper operating limit voltage of the voltage range for the microactuator for use in positioning the second selected read/write head for writing the remaining predetermined burst patterns;

(c2) providing a predetermined voltage within the voltage range of the microactuator, the voltage based on a number of digital to analog conversion counts supplied to a microactuator driver to position the second selected read/write head radially offset and adjacent the first of the predetermined plurality of burst patterns for writing a subsequent burst pattern radially offset and adjacent the first of the predetermined plurality the a burst patterns;

(c3) increasing the predetermined voltage to a voltage within the voltage range of microactuator for use by the microactuator driver to position the second selected read/write head radially offset and adjacent the subsequent burst pattern for writing a next subsequent burst pattern radially offset and adjacent a prior subsequent burst pattern of the predetermined plurality of burst patterns written to the second rotatable disc surface; and (c4) repeating increasing step (c3) until each of the predetermined plurality of burst patterns have been written to the second rotatable disc surface.

15. The method of claim 9 in which a burst track is formed on the second rotatable disc surface via completion of the maintaining step (c) and in which the determining step (d) comprising steps of:

(d1) maintaining the first selected read/write head substantially stationery and adjacent the set-point of the servo track subsequent to formation the burst track;

(d2) applying a low-end of a voltage range to the microactuator to position the second selected head adjacent an outer boundary of the burst track;

(d3) performing a burst scan across the burst track by applying incremental increases in voltage from the low-end voltage through to an upper operating limit voltage of the microactuator while reading and recording an amplitude profile, in digital to analog conversion counts, for each of the predetermined plurality of burst patterns as the burst track rotates at a nominal speed adjacent the second selected head;

(d4) analyzing each of the amplitude profiles to determine a digital to analog conversion count corresponding to a 50 percent amplitude value of the amplitude profile on an amplitude increasing portion of the amplitude profile and a digital to analog conversion count corresponding to a 50 percent amplitude value of the amplitude profile on an amplitude decreasing portion of the amplitude profile to provide the pair of burst width values for each of the predetermined plurality of burst patterns;

(d5) utilizing each pair of burst width values to populate variable cells of a matrix of a third order linear least squares problem; and (d6) deriving a set of constants for use with the equation to provide a linear displacement response of the microactuator in digital to analog conversion counts based on the voltage applied to the microactuator.

16. A method for linearizing a displacement of a microactuator of a disc drive by steps comprising:

(a) selecting a first equation for modeling a linear displacement response of the microactuator responding to an applied voltage;

(b) servoing with a first selected read/write head of the disc drive relative to a set-point of a servo track of a first rotatable disc surface of the disc drive while using a second selected read/write head to write a burst pattern on a second rotatable disc surface of the disc drive;

(c) determining and using a pair of digital to analog converter count burst width values from a series of burst scans of the burst pattern written to the second selected rotatable disc surface to derive a set of constants for use with the equation to linearize the microactuator response;

(d) choosing a second equation for modeling a predetermined linear displacement of the microactuator; and (e) utilizing the set of constants with the first equation to derive a set of displacement responses from a set of a predetermined input voltages to provide a set of equations for use in determining a set of constants to be used by the second equation to provide a voltage to the microactuator to displace the microactuator a predetermined distance.

17. The method of claim 16 in which the microactuator is a piezoelectric transducer.

18. The method of claim 16 in which the first equation is a third order polynomial equation and the second equation is a fourth order polynomial equation.

19. The method of claim 17 in which the servoing step (b) comprising steps of:

(b1) positioning the first selected read/write head supported by a first actuator arm adjacent the servo track of the first rotatable disc surface using a head stack assembly controlled by a servo control circuit to align the first selected read/write head adjacent the servo track, the servo control circuit responding to a measured position of the first selected read/write head relative to the set-point;

(b2) reading a position signal of the first servo track with the first selected head to provide position information to the servo control circuit for position-controlling the first selected head substantially stationery relative to the set-point of the servo track while writing the burst pattern on the second selected rotatable disc surface rotating beneath the second selected read/write head;

(b3) realigning the first selected read/write head adjacent a first of a plurality of a predetermined sequence of set-points of the servo track and position-controlling, the first selected read/write head substantially stationery relative to the first of the plurality of the predetermined sequence of set-points of the servo track while executing a burst scan on the burst written to the second selected rotatable disc surface rotating beneath the second selected read/write by incrementally increasing a voltage applied to the microactuator;

(b4) recording a plurality of amplitude measurements of the burst pattern written to the second selected rotatable disc surface rotating beneath the second selected read/write head along with the number of incremental increases in voltage applied to the microactuator associated with each of the plurality of amplitude measurements; and (b5) repeating process steps (b3) and (b4) until each of the plurality of the predetermined sequence of set-points of the servo track have been processed.

20. The method of claim 19 in which the equation of selecting step (a) is a polynomial equation, a burst track is formed on the second rotatable disc surface via completion of the servoing step (b) and in which the determining step (c) comprising steps of:

(c1) reading the plurality of amplitude measurements along with the number of incremental voltage increases applied to the microactuator associated with each of the plurality of amplitude measurements burst width values recorded by recording step (b4) for use in determining the pair of digital to analog converter count burst width values for each of the series of burst scans;

(c2) determining the pair of digital to analog converter count burst width values for each of the series of burst scans by identifying a number of incremental voltage increases applied to the microactuator corresponding to each of two points of an amplitude each having one half the amplitude of a peak amplitude of the burst pattern;

(c5) utilizing each pair of burst width values to populate variable cells of a matrix of a third order linear least squares problem; and (c6) deriving a set of constants for use with the polynomial equation to provide a linear displacement response of the microactuator in digital to analog conversion counts based on the voltage applied to the microactuator.

* * * * *